(12) United States Patent
Harris et al.

(10) Patent No.: US 6,472,444 B2
(45) Date of Patent: Oct. 29, 2002

(54) CLOSED CELL PHENOLIC FOAM

(75) Inventors: Mark Stanley Harris, Cheshire (GB); Graham Morgan Edgerley, Derbyshire (GB)

(73) Assignee: Kingspan Industrial Insulation Limited, Darbyshire (GB)

( * ) Notice: Subject to any disclaimer, the term of this patent is extended or adjusted under 35 U.S.C. 154(b) by 8 days.

(21) Appl. No.: 09/963,691

(22) Filed: Sep. 27, 2001

(65) Prior Publication Data

US 2002/0061935 A1 May 23, 2002

Related U.S. Application Data

(63) Continuation of application No. 09/710,846, filed on Nov. 14, 2000, now abandoned, which is a continuation of application No. PCT/IB99/00871, filed on May 14, 1999.

(30) Foreign Application Priority Data

May 15, 1998 (GB) .............................................. 9810582
Oct. 29, 1998 (IE) ................................................. 980889

(51) Int. Cl.[7] .......................... C08J 9/14; C11D 17/00; B01F 17/00
(52) U.S. Cl. ........................ 521/88; 510/408; 510/411; 510/418; 516/10; 521/114; 521/131; 521/181
(58) Field of Search ............................ 521/131, 88, 114, 521/181; 510/408, 411, 415; 516/10

(56) References Cited

U.S. PATENT DOCUMENTS 5,444,098 A * 8/1995 Wallaeys et al. ............ 521/181
5,489,619 A * 2/1996 Barcroft et al. ............. 521/131
6,133,332 A * 10/2000 Ide et al. ..................... 521/131

FOREIGN PATENT DOCUMENTS

| EP | 0170357 A1 | 2/1986 |
| EP | 0439283 A1 | 7/1991 |
| EP | 0579321 A1 | 1/1994 |
| GB | 98/00891 | * 10/1998 |
| WO | WO98/17715 | 4/1998 |
| WO | 9830623 | * 7/1998 |
| WO | WO98/42775 | 10/1998 |

OTHER PUBLICATIONS

Database WPI Section Ch, Week 9834, Derwent Publications Ltd. WO9830623A (Daikin Kogyo KK), Jul. 16, 1998.

Database WPI Section Ch, Week 9147, Derwent Publications Ltd. JP03231941A (Asahi Glass Co Ltd), Oct. 15, 1991.

* cited by examiner

Primary Examiner—Morton Foelak
(74) Attorney, Agent, or Firm—Jacobson Holman, PLLC

(57) ABSTRACT

A closed cell phenolic foam is formed from a phenolic resin, a blowing agent such as HCFC141b, a catalyst and less than 2.5% by weight relative to the resin of at least one hydrofluoroether or an azeotrope formulation thereof. 1-methoxy-nonafluorobutane and especially an azeotrope formulation thereof with trans-1,2-dichloroethylene are preferred hydrofluoroethers. The phenolic foam has a stable closed cell content of greater than 90% and a stable thermal conductivity.

21 Claims, No Drawings

CLOSED CELL PHENOLIC FOAM

This application is a continuation of Ser. No. 09/710,846 filed Nov. 14, 2000 abandoned which is a continuation of PCT/IB99/00871 filed MAY 14, 1999.

This invention relates to a closed cell phenolic foam and to a process for preparing such foams from resins.

Phenolic foams are widely used in building applications in view of their thermal insulation and fire resisant properties. Such phenolic foams are generally prepared by mixing a phenol formaldehyde resin with a blowing agent, a cell stabiliser and a hardener.

EP-A-0170357 describes one such process for preparing a phenolic foam using Freon as a blowing agent, aqueous sulphuric acid as a hardener, and a cell stabiliser derived by oxylating castor oil with ethylene oxide or mixtures thereof with proplylene oxide. Freon is a particular chlorofluorocarbon (CFC).

EP-A-0439283 describes the use of a complex blend of materials as an alternative blowing agent to a CFC The blend comprises: at least one perfluoroalkane (PFA) (especially perfluoropentane, perfluorohexane or perfluoroheptane); and at least one component selected from a hydrogenated chlorofluorocarbon (HFC) and a specific alkane or cydoane.

EP-A0579321 descries a phenolic foam including pezffuro-N-methyl morpholine.

WO-A-9811715 describes the manufacture of resol foams using perfluorinated ethers as part of the blowing agent blend.

There is a need for an improved phenolic foam which is easily processed, environmentally friendly and has good thermal conductivity properties.

STATEMENTS OF INVENTION

According to the invention there is provided a closed cell phenolic foam formed from a phenolic resin, a blowing agent, a catalyst and at least one hydrofluroether or an azeotrope formulation thereof in an amount of less than 2.5% by weight relative to the resin to form a phenolic foam having a closed cell content of greater than 90% and a stable thermal conductivity.

Most preferably the hydrofluroether is present in an amount of from 0.5% to 1.5% by weight relative to the resin.

In a preferred embodiment of the invention the hydrofluoroether is of the general formula $C_aF_bOCH_3$ or $C_aF_bOC_2H_5$ wherein:

$b=2a+1$

Preferably the hydrofluoroether is $C_4F_9OCH_3$ (1-methoxy-nonafluorobutane).

Ideally the hydrofluoroether is in an azeotrope formulation, especially with trans-1,2 dicloroethylene.

In a particularly preferred embodiment the azeotrope formulation is a 50/50 formulation of 1-methoxy-nonaffuorobutane with trans 1,2, dichloroethylene.

The azeotrope formulation may be formed by a reaction of two or more components, at least one component being present in the phenolic resin.

The blowing agent may include a hydrogenated chlorfluorocabon (HCFC). Ideally, the HCFC is HCFC 14Ib ($CCl_2F$—$CH_3$).

Alternatively the blowing agent may include a hydrogenated fluorocarbon (HFC).

The foam may include an alkane or cycloalkane.

In a particularly preferred aspect the invention provides a closed cell phenolic foam formed from a phenolic resin, a blowing agent, a catalyst and less than 2.5% by weight relative to the resin of 1-methoxy-nonaflurobutane or an azeotrope formulation-thereof with trans-1,2-dichloroethylene.

In a preferred aspect the invention provides a closed cell phenolic foam from a phenolic resin, HCFC 141 b ($CCl_2F$—$CH_3$) a catalyst and less than 2.5% by weight relative to the resin of 1-methoxy-nonaflurobutane or an azeotrope formulation thereof with trans-1, 2-dichloroethylene.

In an especially preferred aspect the invention provides a dosed cell phenolic foam formed from a phenolic resin, HCFC 1416 ($CCl_2F$—$CH_3$), a catalyst and less than 2.5% by weight relative to the resin of an azeotrope of 1-mehoxy nonaflurobutane wit trans-1,2-dichloroethylene.

Preferably the catalyst is a strong mineral acid such as sulphuric acid counting at least 20% water, preferably at least 40% water.

The invention fire provides a blend for forming a closed cell phenolic foam of the invention, the blend comprising a blowing agent, a catalyst and less than 2.5% by weight relative to a phenolic resin of at least one hydrofluroether or an azeotrope formulation thereof.

DETAILED DESCRIPTION

The invention will be more clearly understood from the following description thereof given by way of example.

The invention is based on the surprising finding that closed cell phenolic foams can be produced by using relatively small quantities of at least one hydrofluoroether (HFE). It is believed that the HE acts as a surfactant.

Ethers are usually strong solvents which can have an adverse cell opening effect on foam and would therefore not normally be considered as suitable components for closed cell foams. We have however, surprisingly found that hydrofluoretheres can be effectively used as surfactants in foam formulations.

In addition to this unexpected use of such ethers, there is the further major advantage that these solvents have much less environmental impact than conventional solvents used in foam manufacture. Such solvents have a very low global warming potential when compared with conventional solvents used in such foam formulations.

Most importantly and unexpectedly we have found that not only is a highly closed cell foam produced using a hydrofluroether with a low global warning potential but also the foam produced has an extremely favourable stable thermal conductivity profile.

The dosed cell value may be measured by the method described in B.S. 4370/ASTM D2856. The foam of the invention has a closed cell content of greater than 90% when measured by this method.

The K value is measured as described in method 7A of B.S. 4370 part 2 with reference to B.S.3927. ASTM C177 is equivalent. The preferred foam of the invention has a K value at 30 days or longer of less than about 0.018 W/M°C. Even more surprisingly the thermal conductivity remains stable when tested at high temperatures of about 70° C. over prolonged periods.

EXAMPLE 1

A phenolic resin was used which was prepared from the ingredients and using the process described in Examples 1 to 3 of EP-A-0170357. This specification is incorporated herein by reference.

Foams were manufactured in the laboratory using the formulations below. The chemicals were mixed using a high speed laboratory stirrer and dispensed into a mould having a volume as approximately 0.03m$^3$. The mould was subsequently placed in an oven at 70° C. for a minimum of 3 hours. After demoulding, the foam was allowed to cool down to ambient temperature prior to commencement of thermal conductivity testing.

|  | Foam A (pbw) | Foam B (pbw) |
| --- | --- | --- |
| Phenolic resin | 100 | 100 |
| Blowing agent HCFC 141b | 10 | 10 |
| HFE 7100 | 0.54 | 0 |
| Catalyst* | 12 | 12 |

*The catalyst is 50% sulphuric acid/50% water.

Thermal conductivity testing was performed at ambient and at 70° C. and the results are shown in the Table below. It is very clear that without the HFE surfactant, the drift in thermal conductivity is very rapid both at ambient and 70° C. whilst with HEE 7100 as surfactant. the thermal conducivity drifts to a value in the region of 0.018 W/M°K–0.019 W/M°K.

| THERMAL CONDUCTIVITY (W/M° C. at 10° C.) | | | | | | |
| --- | --- | --- | --- | --- | --- | --- |
| | | | Days | | | |
| | | 1 | 4 | 15 | 17 | 42 |
| Foam A | Ambient | 0.0168 | | 0.0184 | | |
| | 70° C. | | 0.0159 | | 0.0179 | 0.0193 |
| Foam B | Ambient | 0.0184 | | 0.0304 | | |
| | 70° C. | | 0.0291 | | 0.0298 | |

HFE 7100 is 1-methoxy-nonafluorobutane having the formula $C_4H_9OCH_3$. It has a boiling point of 60° C.

EXAMPLE 2

Discontinuous block foam, was manufactued on a commercial scale plant to produce blocks of dimensions of approximately 2440×1000×1000 mm. The foam mix was dispensed through a low pressure mixer into a heated mould. The product was put through a three hour curing cycle prior to demould. The foam was manufactured according to the following formulation.

|  | amount |
| --- | --- |
| Phenolic resin (example 1): | 100 pbw |
| Blowing agent: HCFC 141b | 10.8 pbw |
| HFE 71 DE | 1.2 pbw |
| Catalyst*: | 11.68 pbw |
| colour: KDS black | 0.3 bw |

*The catalyst is a blend of sulphuric and phosphoric acid containing 42.5% sulphuric, 13.6% phosphoric (as a fire retardant) and the balance water.

The density of the foam thus formed was 35 kg/m$^3$. HFE 71 DE is a 50/50 blend of HFE 7100 with trans 1, 2 dichloroethylene of the formula CHCl. CHCl. The material is available from 3M. The particular advantage of tis material is that it is an azeotrope and boils at 40° C. which gives good processing characteristics, especially in producing a laminated product.

We have found that these foams have excellent thermal conductivity stability as follows:

| Thermal Conductivity W/M° C. at 10° C. | | | | | | |
| --- | --- | --- | --- | --- | --- | --- |
| Conditioning | On manu-facture | 7 days | 21 days | 42 days | 63 days | 90 days |
| Ambient | 0.0166 | 0.0146 | 0.0147 | 0.0156 | 0.0166 | 0.017 |
| +70° C. | — | 0.0151 | 0.0168 | 0.0171 | 0.018 | 0.0182 |

EXAMPLE 3

Using the method described in Example 2 a foam was manufactured according to the following formulation.

|  | Amount |
| --- | --- |
| Phenolic Resin (Example 1) | 100 pbw |
| Blowing Agent: HCFC 141b | 10.8 pbw |
| HFE 71 DE | 1.2 pbw |
| Catalyst* (Example 2) | 11.7 pbw |
| Colour: KDS Black | 0.3 pbw |

The density of the foam thus formed was 35 kg/m$^3$.

The foam of this example has excellent thermal conductivity stability as follows.

| Thermal Conductivity W/M° C. at 10° C. | | | | | | |
| --- | --- | --- | --- | --- | --- | --- |
| Conditioning | Initial | 7 days | 21 days | 42 days | 63 days | 125 days |
| Ambient | 0.0167 | 0.0146 | 0.0157 | 0.0157 | 0.0159 | 0.0174 |
| +70° C. | — | 0.0134 | 0.0152 | 0.0165 | 0.0174 | 0.0180 |

EXAMPLE 4

Using the method described in Example 2 a foam was manufactured according to the following formulation

|  | Amount |
| --- | --- |
| Phenolic Resin (Example 1) | 100 pbw |
| Blowing Agent: HCFC 141b | 10.5 pbw |
| HFE 17 DE | 0.57 pbw |
| Catalyst (Example 2) | 11.7 pbw |
| Colour: KDS black | 0.3 pbw |

The density of the foam thus formed was 35 kg/M$^3$.

The foam of this example has excellent thermal conductivity stability as follows:

| Thermal Conductivity W/M° C. at 10° C. | | | | | | |
| --- | --- | --- | --- | --- | --- | --- |
| Conditioning | Initial | 7 days | 21 days | 42 days | 63 days | 125 days |
| Ambient | 0.0151 | 0.0149 | 0.0160 | 0.0155 | 0.0167 | 0.0174 |
| +70° C. | — | 0.0138 | 0.0153 | 0.0165 | 0.0180 | 0.0180 |

Typical global warming potentials for perfluoroalkanes are as follows:

| | |
|---|---|
| CF$_4$ | 6500 |
| C$_2$F$_6$ | 9200 |
| C$_3$F$_8$ | 7000 |
| C$_5$F$_{12}$ | 7500 |
| C$_6$F$_{14}$ | 7400 |

This is in complete contrast to MT 7100 which has a global warming potential of 500 and especially HFE 71DE which has a global waring potential of 250. Thus, the use of HFE's in phenolic foam formulations has considerable environmental advantages compared with perfluoroalkanes.

It is envisaged that the HCFC's used in the phenolic foam blowing agent blend of the invention may be selected, for example, from one or more of:

| | |
|---|---|
| HCFC 141b | CCl$_2$F—CH$_3$ |
| HCFC 142b | CH$_3$CClF$_2$ |
| HCFC 123 | CF$_3$—CHCl$_2$ |
| HCFC 124 | CHClF$_2$ |
| HCFC 225ca | CHCl$_2$—CF$_2$—CF$_3$ |
| HCFC 225cb | CClF$_2$—CF$_2$—CHClF |

It is also envisaged that the blowing agent blend may induce a suitable hydrogenated fluorocarbon selected, for example, from one or more of

| | |
|---|---|
| HFC 125 | CHF$_2$—CH$_3$ |
| HFC 134 a | CF$_3$CH$_2$F |
| HFC 152 a | CH$_3$—CHF$_2$ |
| HFC 245fa | CF$_3$—CH$_2$—CHF$_2$ |
| HFC 365mfc | CF$_3$—CH$_2$—CF$_2$—CH$_3$ |

The HFC's may be represented by the formula $C_RH_PF_Q$ whenever:

R is an integer from 1 to 4

P is an integer from 1 to 5 and Q=(2R+2)–P for an open chain HBC and (2R–P) for a cyclic HFC.

It is further envisaged that the phenolic foam blowing agent blend may include an alkane, especially n-pentane, or a cydoalkane, especially cyclopentane.

The invention is not limited to the embodiments hereinbefore described which may be varied in detail.

What is claimed is:

1. A closed cell phenolic foam formed from a phenolic resin, a blowing agent, a catalyst and at least one hydrofluroether of the general formula $C_aF_bOCH_3$ or $C_aF_bOC_2H_5$ wherein:

$$b=2a+1$$

or an azeotrope formulation thereof in an amount of less than 2.5% by weight relative to the resin to form a phenolic foam having a closed cell content of greater than 90% and a stable thermal conductivity.

2. A foam as claimed in claim 1 wherein the hydrofluoether is present in an amount of from 0.5% to 1.5% by weight relative to the resin.

3. A foam as claimed in claim 1 wherein the hydrofluoroether is $C_4F_9OCH_3$ (1-methoxy-nonafluorobutane).

4. A foam as claimed in claim 1 wherein the hydrofluoroether is in an azeotrope formulation.

5. A foam as claimed in claim 4 wherein the hydrofluoroether is in an azeotrope formulation with trans-1,2-dichloroethylene.

6. A foam as claimed in claim 5 wherein the azeotrope formulation is a 50/50 formulation of 1-methoxy-nonafluorobutane with trans 1,2, dichloroethylene.

7. A foam as claimed in claim 5 wherein the azeotrope formulation is formed by a reaction of two or more components, at least one component being present in the phenolic resin.

8. A foam as claimed in claim 1 wherein the blowing agent includes a hydrogenated chlorofluorocarbon (HCFC).

9. A foam as claimed in claim 8 wherein the HCFC is HCFC 141b (CCl$_2$F—CH$_3$).

10. A foam as claimed in claim 1 wherein the blowing agent includes a hydrogenated fluorocarbon (HFC).

11. A foam as claimed in claim 1 wherein the blowing agent includes an alkane or cycloalkane.

12. A closed cell phenolic foam formed from a phenolic resin, a blowing agent, a catalyst and less than 2.5% by weight relative to the resin of 1-methoxy-nonaflurobutane or an azeotrope formulation thereof with trans-1,2-dichloroethylene.

13. A closed cell phenolic foam formed from a phenolic resin, HCFC 141b (CCl$_2$F—CH$_3$), a catalyst and less than 2.5% by weight relative to the resin of 1-methoxy-nonaflurobutane or an azeotrope formulation thereof with trans-1,2-dichloroethylene.

14. A closed cell phenolic foam formed from a phenolic resin, HCFC 141b (CCl$_2$F—CH$_3$), a catalyst and less than 2.5% by weight relative to the resin of an azeotrope of 1-methoxy nonaflurobutane with trans-1,2-dichloroethylene.

15. A closed cell phenolic foam as claimed in claim 1 wherein the catalyst is a mineral acid containing at least 20% water.

16. A closed cell phenolic foam as claimed in claim 13 wherein the catalyst is a mineral acid containing at least 20% water.

17. A closed cell phenolic foam as claimed in claim 14 wherein the catalyst is a mineral acid containing at least 20% water.

18. A blend for producing a closed cell phenolic foam as claimed in claim 1, the blend comprising a blowing agent and at least one hydrofluroether of the general formula $C_aF_bOCH_3$ or $C_aF_bOC_2H_5$ wherein:

$$b=2a+1$$

or an azeotrope formulation thereof in an amount of less than 2.5% by weight relative to the resin to form a phenolic foam having a closed cell content of greater than 90% and a stable thermal conductivity.

19. A blend for producing a closed cell phenolic foam as claimed in claim 13, the blend comprising HCFC 141b (CCl$_2$F—CH$_3$), a catalyst and less than 2.5% by weight relative to the resin of 1-methoxy-nonaflurobutane or an azeotrope formulation thereof with trans-1,2-dichloroethylene.

20. A blend for producing a closed cell phenolic foam as claimed in claim 14, the blend comprising HCFC 141b (CCl$_2$F—CH$_3$), a catalyst and less than 2.5% by weight relative to the resin of an azeotrope of 1-methoxy nonaflurobutane with trans-1,2-dichloroethylene.

21. A closed cell phenolic foam as claimed in claim 1 wherein the at least one hydrofluroether comprises a hydrofluroether of the general formula $C_aF_bOC_2H_5$.

* * * * *